(12) United States Patent
Nakamura et al.

(10) Patent No.: US 6,280,810 B1
(45) Date of Patent: *Aug. 28, 2001

(54) PHASE-CHANGE INFORMATION RECORDING MEDIUM AND OPTICAL RECORDING METHOD TO MAKE HIGHER ROTATION RATES FEASIBLE

(75) Inventors: Yuki Nakamura; Katsuyuki Yamada; Eiji Noda; Ippei Ogawa, all of Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/427,589

(22) Filed: Oct. 27, 1999

(30) Foreign Application Priority Data

Oct. 30, 1998 (JP) .................................. 10-310528

(51) Int. Cl.⁷ ...................................... B32B 3/02
(52) U.S. Cl. ................. 428/64.1; 428/64.4; 428/64.5; 428/64.6; 428/457; 428/913; 430/270.13; 430/495.1; 430/945; 369/283; 369/288
(58) Field of Search ................. 428/64.1, 64.2, 428/64.4, 64.5, 64.6, 457, 913; 430/270.13, 495.1, 945; 369/283, 288

(56) References Cited

U.S. PATENT DOCUMENTS

| 5,681,632 | * | 10/1997 | Kitaura | 428/64.1 |
| 5,740,149 | * | 4/1998 | Iwasaki | 369/116 |
| 5,784,355 | * | 7/1998 | Abe | 369/116 |
| 5,948,496 | * | 9/1999 | Kinoshita | 428/64.1 |
| 5,974,025 | * | 10/1999 | Yamada | 369/288 |

* cited by examiner

Primary Examiner—Elizabeth Evans
(74) Attorney, Agent, or Firm—Dickstein Shapiro Morin & Oshinsky LLP

(57) ABSTRACT

An information recording medium includes a substrate, a first protective layer formed on the substrate, a recording layer formed on the first protective layer, and a second protective layer formed on the recording layer. The first protective layer has a thickness in a range from 65 nm to 130 nm. The second protective layer has a thickness in a range from 15 nm to 45 nm. The recording layer has a thickness in a range from 15 nm to 35 nm and is composed of a phase-change alloy with the composition in terms of atomic percentage being represented by the formula $Ag_a In_b Sb_c Te_d$ where $0<a<6$, $3 \leq b \leq 15$, $50 \leq c \leq 65$, $20 \leq d \leq 35$, $a+b+c+d=100$.

The information recording medium is configured to provide capabilities of reading, writing and overwriting of information at linear rotation rates ranging from 1.2 m/s to 11.2 m/s. Further, an optical recording method is adapted to achieve the reading, writing and overwriting of information for the information recording medium at the linear rotation rates without significant degradation.

13 Claims, 7 Drawing Sheets

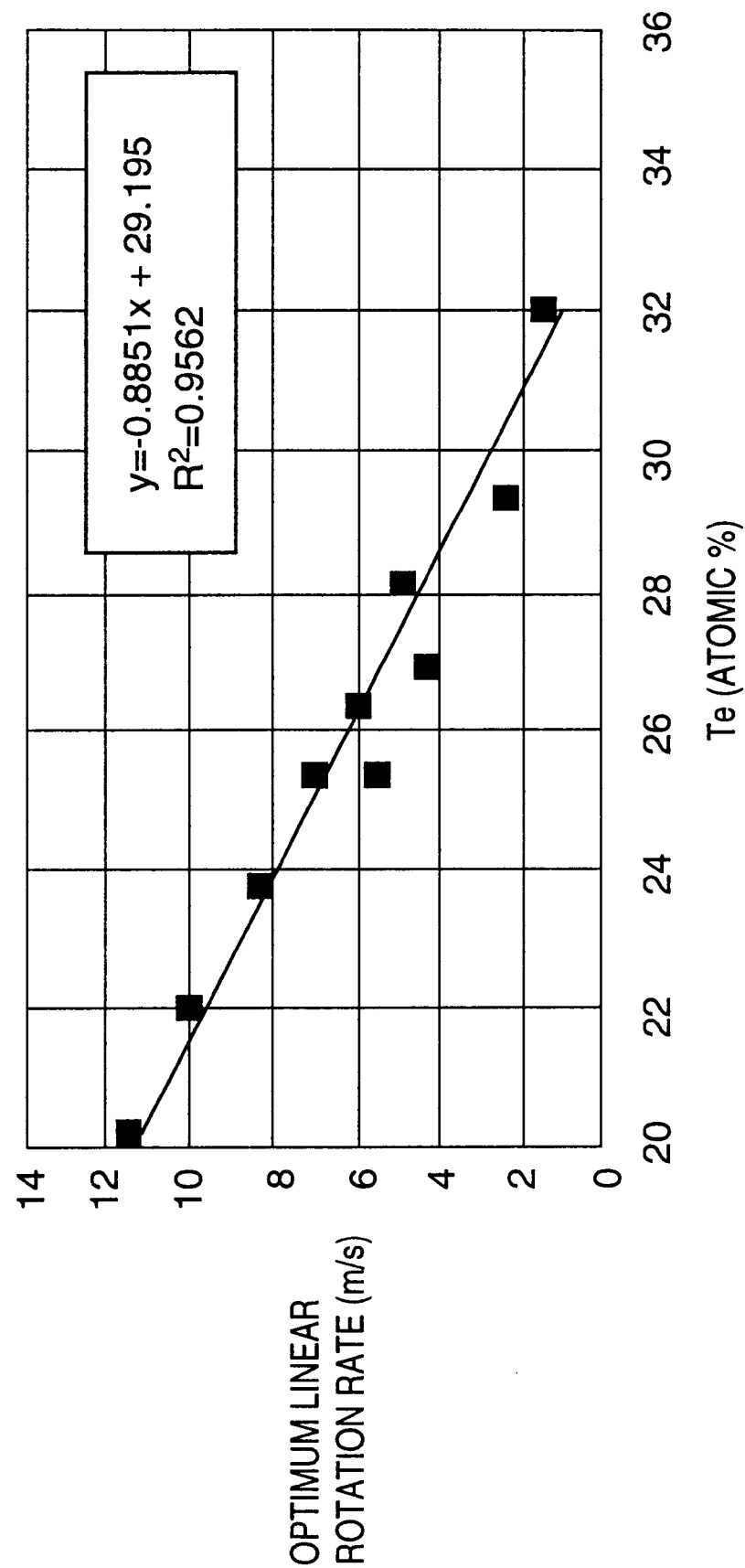

PHASE-CHANGE INFORMATION RECORDING MEDIUM AND OPTICAL RECORDING METHOD TO MAKE HIGHER ROTATION RATES FEASIBLE

BACKGROUND OF THE INVENTION (1) Field of the Invention

The present invention relates to a phase-change information recording medium and an optical recording method which records information to the phase-change information recording medium.

(2) Description of the Related Art

A phase-change information recording medium which utilizes a phase change of a recording layer made of a phase-change alloy, between the crystalline phase and the amorphous phase is known as one of optical information recording media that are capable of reading, writing and erasing of information by the application of light, such as a laser beam, to the recording layer. In the phase-change information recording medium, the entire recording layer is initially set in the crystalline phase. The laser beam is locally emitted to a portion of the recording layer in the recording medium, and the recording layer portion is heated above the melting point of the recording layer by the light energy, and rapidly cooled so that the recording layer portion is set in the amorphous phase.

In a conventional recoding method for the information recording media of the above type, a data signal is supplied to a semiconductor laser of an optical pickup through pulsewidth modulation (PWM), so that the laser is operated in accordance with a controlled power supplied to the laser so as to emit a laser beam to the recording layer of the recording medium. In this manner, a sequence of amorphous/crystalline phases is created along the track of the recording medium so that the data signal is encoded in the recording medium.

The standard requirements for rewritable compact disk have been provided by the so-called orange book, part III. The rewritable compact disk is a type of the above-mentioned information recording media. According to the standard requirements, the linear rotation rate of the rewritable compact disk is to be in a range from 2.4 m/s to 2.8 m/s. This linear rotation rate is only twice as large as the basic linear rotation rate which is in a range from 1.2 m/s to 1.4 m/s.

However, with recent development of personal computers with high-speed data processing performance, there is an increasing demand for an improved phase-change information recording medium for use in the recent personal computers which can achieve the reading, writing and overwriting of information at higher rotation rates than those achieved by a conventional phase-change information recording medium. In addition, it is desirable to establish an optical recording method which can achieve the reading, writing and overwriting of information for the improved phase-change information recording medium at the higher rotation rates without significant degradation.

SUMMARY OF THE INVENTION

An object of the present invention is to provide an improved phase-change information recording medium and the optical recording method thereof in which the above-described problems are eliminated.

Another object of the present invention is to provide a phase-change information recording medium which can achieve the reading, writing and overwriting of information, without significant degradation, at higher rotation rates than those achieved by a conventional phase-change information recording medium.

Another object of the present invention is to provide an optical recording method which can achieve the reading, writing and overwriting of information for the improved phase-change information recording medium at the higher rotation rates without significant degradation.

The above-mentioned objects of the present invention are achieved by an information recording medium which includes a substrate, a first protective layer formed on the substrate, a recording layer formed on the first protective layer, and a second protective layer formed on the recording layer, the first protective layer having a thickness in a range from 65 nm to 130 nm, the second protective layer having a thickness in a range from 15 nm to 45 nm, the recording layer having a thickness in a range from 15 nm to 35 nm and being composed of a phase-change alloy with the composition in terms of atomic percentage being represented by the formula $Ag_a In_b Sb_c Te_d$ where $0 < a \leq 6$, $3 \leq b \leq 15$, $50 \leq c \leq 65$, $20 \leq d \leq 35$, $9 + b + c + d = 100$, the recording medium being configured to provide capabilities of reading, writing and overwriting of information at linear rotation rates ranging from 1.2 m/s to 11.2 m/s.

The above-mentioned objects of the present invention are achieved by an optical recording method for writing or overwriting of information to an information recording medium through a pulsewidth modulation PWM conversion, the optical recording method including the steps of: providing an information recording medium which comprises a substrate, a first protective layer formed on the substrate, a recording layer formed on the first protective layer, and a second protective layer formed on the recording layer, the first protective layer having a thickness in a range from 65 nm to 130 nm, the second protective layer having a thickness in a range from 15 nm to 45 nm, the recording layer having a thickness in a range from 15 nm to 35 nm and being composed of a phase-change alloy with the composition in terms of atomic percentage being represented by the formula $Ag_a In_b Sb_c Te_d$ where $0 < a \leq 6$, $3 \leq b \leq 15$, $50 \leq c \leq 65$, $20 \leq d \leq 35$, and $a + b + c + d = 100$, the recording medium being configured to provide capabilities of reading, writing and overwriting of information at linear rotation rates ranging from 1.2 m/s to 11.2 m/s; and supplying a data signal to a semiconductor laser via a PWM converter so that the laser is operated in accordance with a controlled power supplied by the PWM converter and the data signal is encoded in the recording layer of the recording medium by a laser beam emitted by the laser, wherein the data signal has a waveform of power-control pulses with a fixed clock duration, the controlled power supplied to the laser including at least three power levels including a write power level Pw, an erase power level Pe and a biased power level Pb, where Pw>Pe>Pb, the waveform of power-control pulses including a multi-pulse portion with a number of cycles, each cycle including a selected one of either the write power level Pw for a pulse duration $t_{on}$ and the biased power level Pb for a pulse duration $t_{off}$, or the erase power level Pe for a pulse duration $t_{on}$ and the biased power level Pb for a pulse duration $t_{off}$, wherein each of the linear rotation rates of the recording medium is set to an integer multiple of a basic linear rotation rate Vmin which ranges from 1.2 m/s to 1.4 m/s, and wherein a duty ratio of the multi-pulse portion in the data signal represents a ratio of an on-time of the semiconductor laser to a multi-pulse duration and is given by $t_{on}/(t_{on}+t_{off})$, and the duty ratio is set to one of a plurality of ranges of 0.05 to 0.4, 0.1 to 0.6, 0.2 to 0.8, 0.25 to 1.0, and 0.3 to 1.0 for the linear rotation rates Vmin, 2Vmin, 4Vmin, 6Vmin, and 8Vmin, respectively.

In a preferred embodiment of the phase-change information recording medium of the invention, the recording characteristics of the recording medium have been verified from the experimental results which indicate that the recording medium of the invention can achieve the reading, writing and overwriting of information, without significant degradation, at higher rotation rates than those achieved by a conventional phase-change information recording medium.

In a preferred embodiment of the optical recording method of the invention, the recording characteristics of the recording medium as the result of execution of the optical recording method have been verified which indicate that the optical recording method of the invention can achieve the reading, writing and overwriting of information for the phase-change information recording medium at the higher rotation rates without significant degradation.

BRIEF DESCRIPTION OF THE DRAWINGS

Other objects, features and advantages of the present invention will become more apparent from the following detailed description when read in conjunction with the accompanying drawings in which:

FIG. 3 is a diagram for explaining the characteristics of the optimum linear rotation rate to the tellurium atomic percent in the embodiment of the information recording medium;

DETAILED DESCRIPTION OF THE PREFERRED EMBODIMENTS

A description will now be given of the preferred embodiments of the present invention with reference to the accompanying drawings.

Figure 1:
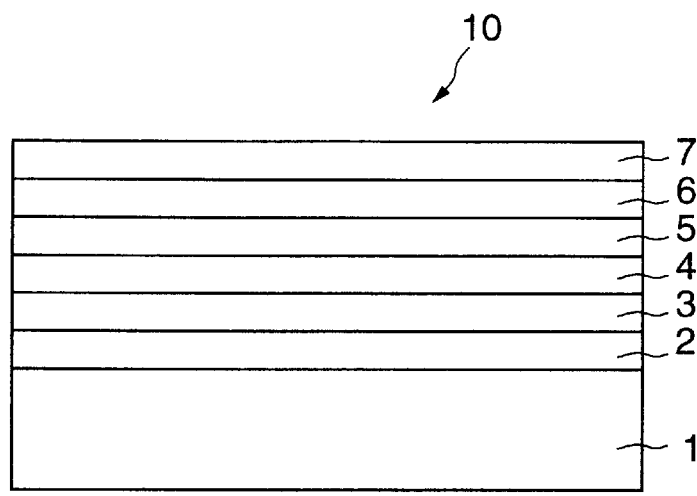
FIG. 1 is a cross-sectional view of a preferred embodiment of the information recording medium of the invention.

FIG. 1 is a cross-sectional view of a preferred embodiment of the phase-change information recording medium of the invention.

As shown in FIG. 1, the phase-change information recording medium 10 of the present embodiment includes a substrate 1, a first protective layer 2 formed on the substrate 1, a recording layer 3 formed on the first protective layer 2, a second protective layer 4 formed on the recording layer 3, a heat-dissipating reflection layer 5 formed on the second protective layer 4, an oxidation-preventing overcoat layer 6 formed on the reflection layer 5, and a print layer 7 formed on the overcoat layer 6.

As for the substrate 1 in the recording medium 10 of the present embodiment, glasses, ceramics and resin materials are suitable for a source material of the substrate 1. Among these materials, the resin materials are more suitable for the source material of the substrate 1 as they are generally inexpensive and provide the ease of formation. For example, a polycarbonate resin, an acrylic resin, an epoxy resin, a polystyrene resin, an 1acrylonitrile-styrene copolymer resin, a polyethylene resin, a polypropylene resin, a silicone-based resin, a fluorine-based resin, an ABS resin and an urethane resin are suitable for the source material of the substrate 1. As a polycarbonate resin and an acrylic resin provide the ease of formation and good optical characteristics with low cost, and they are more suitable for the source material of the substrate 1.

Alternatively, the substrate 1 may be formed into a sheet-like or card-like configuration. However, in the present embodiment of the recording medium 10, the substrate 1 is configured into a round plate, and the recording medium 10 is formed into a rewritable compact disk (CD-RW). In such a case of the rewritable compact disk, the substrate 1 generally has a width in a range from 0.25 μm to 0.65 μm (more suitably, in a range from 0.30 μm to 0.55 μm), and a depth in a range from 200 Å to 650 Å. The rewritable compact disk has a groove depth in a range from 250 Å to 550 Å.

The first and second protective layers 2 and 4 are formed such that the recording layer 3 is sandwiched between the protective layers 2 and 4, and serve to protect the recording layer 3. In the recording medium 10 according to the invention, various metal oxides, nitrides, sulfides and carbides may be used as a suitable source material of the first and second protective layers 2 and 4. For example, SiO, $SiO_2$, ZnO, $SnO_2$, $Al_2O_3$, $TiO_2$, $In_2O_3$, MgO, $ZrO_2$, $Si_3N_4$, AlN, TiN, BN, ZrN, ZnS, $In_2S_3$, $TaS_4$, SiC, TaC, $B_4C$, WC, TiC, and ZrC are suitable for the source materials of the first and second protective layers 2 and 4. Such source materials individually or in combination may be used to form the protective layers 2 and 4. When the necessity occurs, a certain amount of impurities may be included in the protective layers 2 and 4.

The first and second protective layers 2 and 4 must have a melting point that is above a melting point of the recording layer 3. The first and second protective layers 2 and 4 can be formed by utilizing any suitable one of various vapor deposition techniques including vacuum deposition, sputtering, plasma CVD (chemical vapor deposition), light CVD, ion plating, and electron-beam deposition. When attaching importance to the aspects of film quality and volume production feasibility, the sputtering technique is more suitable for the formation of the first and second protective layers 2 and 4.

Figure 2:
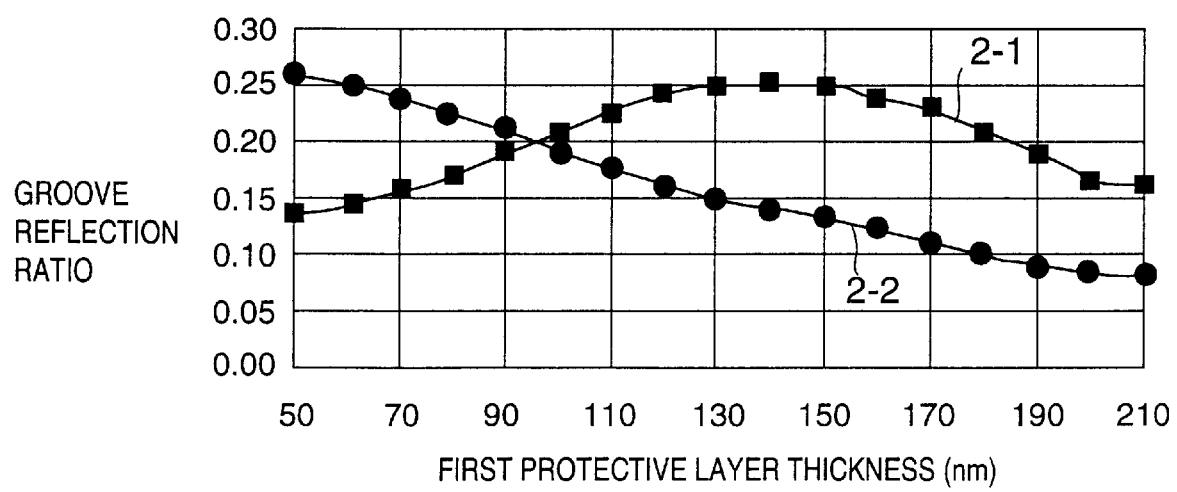
FIG. 2 is a diagram for explaining the characteristics of the groove reflection ratio to the first protective layer thickness in the embodiment of the information recording medium which is configured into a compact disk.

FIG. 2 shows the characteristics of the groove reflection ratio to the first protective layer thickness in the recording medium 10.

The recording medium 10 in the present embodiment is formed into a rewritable compact disk (CD-RW). In the recording medium 10 of the present embodiment, the recording layer 3 has a thickness of 25 nm, the first protective layer 2 has a refractive index of 2.0, the second protective layer 4 has a thickness of 30 nm and a refractive index of 2.0, and the reflection layer 5 has a thickness of 140 nm. In a case of an optical pickup of the type which is used to access a CD and a DVD in a shared manner, it is necessary to take account of the necessity of good characteristics of the groove reflection ratio to the thickness of the first protective layer 2 in the recording medium 10.

In the characteristics of FIG. 2, the characteristic curve, indicated by the line 2-1 in FIG. 2, represents a change in the groove reflection ratio when the first protective layer thickness is varied from 50 nm to 210 nm, in a case of a laser beam of a wavelength of 780 nm (for DVD playback) being applied to the recoding medium 10 of the present embodiment. The characteristic curve, indicated by the line 2-2 in FIG. 2, represents a change in the groove reflection ratio when the first protective layer thickness is varied from 50 nm to 210 nm, in a case of a laser beam of a wavelength of 650 nm (for CD playback) being applied to the recoding medium 10 of the present embodiment.

A standard requirement of the groove reflection ratio for a rewritable compact disk (CD-RW) is in a range from 0.15 to 0.25. As being apparent from the characteristics of FIG. 2, in order to satisfy this standard requirement for both the 650-nm and 780-nm laser beams, it is necessary that the thickness of the first protective layer 2 be in a range from 65 nm to 130 nm. Further, in order to ensure an adequately high groove reflection ratio of the recording medium 10, for both the 650-nm and 780-nm laser beams, that is above 0.18, it is necessary that the thickness of the first protective layer 2 be in a range from 80 nm to 110 nm.

In the recording medium 10 of the present embodiment, the first protective layer 2 has a thickness in a range from 65 nm to 130 nm as described above, and the second protective layer 4 has a thickness in a range from 15 nm to 45 nm. If the thickness of the second protective layer 4 is below the lower limit of 15 nm, the second protective layer 4 does not provide adequate heat-resistance and film-protection functions for the recording layer 3. If the thickness of the second protective layer 4 is above the upper limit of 45 nm, the possibility of an interfacial separation of the second protective layer 4 will not be negligible, and the overwriting repetition property of the recording medium 10 will be deteriorated.

In the recording medium 10 of the present embodiment, the recording layer 3 has a thickness in a range from 15 nm to 35 nm and is composed of a phase-change alloy with the composition in terms of atomic percentage being represented by the formula $Ag_a In_b Sb_c Te_d$ where $0<a\leq 6$, $3\leq b\leq 15$, $50\leq c\leq 65$, $20\leq d\leq 35$, $a+b+c+d=100$.

Alternatively, the recording layer 3 may be composed of a phase-change alloy with the composition in terms of atomic percentage being represented by the formula $Ag_a In_b Sb_c Te_d + M_e$ where $0<a\leq 6$, $3\leq b\leq 15$, $50\leq c\leq 65$, $20\leq d\leq 35$, $0<e\leq 5$, $a+b+c+d+e=100$, and M denotes nitrogen N and/or oxygen O.

In the present embodiment, the recording layer 3 is formed from the above-mentioned elements Ag, In, Sb and Te by using a sputtering technique. The recording layer 3, which is composed of a phase-change alloy with the composition being mainly represented by the above formula $Ag_a In_b Sb_c Te_d$, provides a good recording sensibility and speed, a good erasing sensibility and speed, and a good erase ratio. In order to achieve the reading, writing and overwriting of information for the recording medium 10 at the linear rotation rates, ranging from 1.2 m/s to 11.2 m/s, without significant degradation, it is necessary to suitably adjust the composition of the phase-change alloy of the recording layer 3.

The tellurium (Te) atomic percent in the composition of the phase-change alloy will now be explained. FIG. 3 shows the characteristics of the optimum linear rotation rate to the tellurium atomic percent in the present embodiment of the information recording medium 10. Suppose that the substrate 1 is made of a polycarbonate resin and has a thickness of 1.2 mm, the first protective layer 2 is made of SiO and has a thickness of 100 nm, the recording layer 3 has a thickness of 25 nm, the second protective layer 4 is made of SiO and has a thickness of 30 nm, the reflection layer 5 is made of aluminum and has a thickness of 140 nm, the overcoat layer 6 is made of an ultraviolet (UV) curing resin and has a thickness of 10 $\mu$m, and the recording medium 10 is formed into a rewritable compact disk.

The linear phase-change speed of the phase-change alloy of the recording layer 3 between the amorphous phase and the crystalline phase is varied in a manner similar to the characteristics of FIG. 3 when the tellurium atomic percent is varied from 20 atomic % to 32 atomic %. In the characteristics of FIG. 3, the writing of information to the recording medium 10 is performed through the EFM modulation recording technique by using a semiconductor laser which emits a laser beam with a wavelength of 780 nm. The recording pulse strategy is in conformity with the orange book, part III. The write power level, the erase power level, and the biased power level applied to the semiconductor laser are set to 12 mW, 6 mW, and 1 mW.

As shown in FIG. 3, the optimum linear rotation rate is decreased in a substantially linear manner as the tellurium atomic percent is increased. The straight line, indicated in FIG. 3, is given by the formula y=−0.8851x+29.195, and the correlation coefficient $R^2$ of the plots in FIG. 3 to the straight line is equal to 0.9562. The experimental results of FIG. 3 show that the linearity of the optimum linear rotation rate to the tellurium atomic percent is high. By taking account of the characteristics of FIG. 3 and the experimental errors of ±1%, it is concluded that the tellurium atomic percent in the composition of the phase-change alloy must be below 35 atomic %, even if the linear rotation rate is very small.

The basic linear rotation rate of the compact disk is in a range from 1.2 m/s to 1.4 m/s. Suppose that Vmin denotes the basic linear rotation rate. The experimental results of FIG. 3 show that the tellurium atomic % of the recording layer 3 of the recording medium 10 that is suitable for the linear rotation rates Vmin, 2Vmin (2.4 to 2.8 m/s), 4 Vmin (4.8 to 5.6 m/s) and 8Vmin (9.6 to 11.2 m/s) is approximately 33 atomic %, 30 atomic %, 27 atomic %, and 20 atomic %, respectively. Therefore, the tellurium atomic percent of the recording layer 3 of the recording medium 10 in the present embodiment is in a range from 20 atomic % to 35 atomic %.

The silver (Ag) atomic percent in the composition of the phase-change alloy in the present embodiment will now be explained. If the silver atomic percent is above the upper limit of 6 atomic %, the deterioration of the overwrite repetition property of the recording layer 3 will not be negligible. In such a case, the recording characteristics of the recording medium 10 during an extended period of time after the manufacture will not be reliable. In the present embodiment, the silver atomic percent of the recording layer 3 of the recording medium 10 is in a range from 0 atomic % to 6 atomic %.

The indium (In) atomic percent in the composition of the phase-change alloy in the present embodiment will now be explained. If the indium atomic percent is above the upper limit of 15 atomic %, the deterioration of the archival will not be negligible. If the indium atomic percent is below the lower limit of 3 atomic %, the recording sensitivity of the recording medium 10 will be deteriorated. In the present embodiment, the indium atomic percent of the recording layer 3 of the recording medium 10 is in a range from 3 atomic % to 15 atomic %.

The antimony (Sb) atomic percent in the composition of the phase-change alloy in the present embodiment will now be explained. Generally, the overwriting repetition property of the recording medium 10 will be increased as the antimony atomic percent of the phase-change alloy is increased. However, if the antimony atomic percent is above the upper limit of 65 atomic %, the deterioration of the archival will not be negligible. If the antimony atomic percent is below the lower limit of 50 atomic %, the overwriting repetition property of the recording medium 10 will not be adequate. In the present embodiment, the antimony atomic percent of the recording layer 3 of the recording medium 10 is in a range from 50 atomic % to 65 atomic %.

Accordingly, the recording layer 3 of the recording medium 10 in the present embodiment is composed of a phase-change alloy with the composition in terms of atomic percentage being represented by the formula

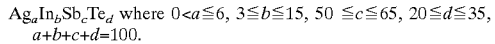

$Ag_a In_b Sb_c Te_d$ where $0 < a \leq 6$, $3 \leq b \leq 15$, $50 \leq c \leq 65$, $20 \leq d \leq 35$, $a+b+c+d=100$.

As described above, in the present embodiment of the recording medium 10, the recording layer 3 has a thickness in a range from 15 nm to 35 nm. If the thickness of the recording layer 3 is below 10 nm, the light absorption property of the recording layer 3 will be significantly lowered, and the recording characteristics will be inadequate. If the thickness of the recording layer 3 is above 100 nm, the linear phase-change speed of the phase-change alloy of the recording layer 3 will be significantly lowered when the linear rotation rate is high. A suitable thickness of the recording layer 3 for practical use is in a range from 10 nm to 100 nm. However, when attaching importance to the aspects of the initial jitter characteristics, the overwriting repetition property and the volume production feasibility, the most suitable thickness of the recording layer 3 is in a range from 15 nm to 35 nm.

Further, the addition of a small amount of N and/or O to the phase-change alloy of the recoding layer 3 in the recording medium 10 of the present embodiment is effective for reducing the deterioration of the archival. For this purpose, it is preferred that the recording layer 3 is composed of a phase-change alloy with the composition in terms of atomic percentage being represented by the formula

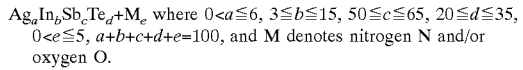

$Ag_a In_b Sb_c Te_d + M_e$ where $0 < a \leq 6$, $3 \leq b \leq 15$, $50 \leq c \leq 65$, $20 \leq d \leq 35$, $0 < e \leq 5$, $a+b+c+d+e=100$, and M denotes nitrogen N and/or oxygen O.

When nitrogen N and/or oxygen O are added to the phase-change alloy Ag—In—Sb—Te of the recording layer 3, the write marks which are created in the recording layer 3 by changing the crystalline phase to the amorphous phase become stable. The added nitrogen and/or oxygen are coupled to the tellurium and/or antimony in the phase-change alloy. If the N and/or O atomic percent in the composition of the phase-change alloy is above the upper limit of 5 atomic %, the nitridation or the oxidation of the recording layer 3 will not be negligible, which is detrimental to the increase of the erase sensibility and the erase ratio. In the present embodiment, the N and/or O atomic percent of the recording layer 3 is in a range from 0 atomic % to 5 atomic %.

When the recording layer 3 is composed of a phase-change alloy Ag—In—Sb—T—N—O with the above-mentioned composition, the overwriting repetition property and the write mark stability can be improved because of the addition of a small amount of N and/or O.

Further, the addition of N and/or O to the phase-change alloy of the recording layer 3 is effective for reducing the linear phase-change speed of the phase-change alloy of the recording layer 3. If the union of Te—N or Sb—Te—N exists in the phase-change alloy of the recording layer 3, the overwriting repetition property can be considerably improved. An electro-spectral analysis technique is useful to detect the presence of Te—N or Sb—Te—N in the phase-change alloy of the recording layer 3. When the electro-spectral analysis is performed, the absorption band of Te—N has the peak in the vicinity of 500 $cm^{-1}$ to 600 $cm^{-1}$, and the absorption band of Sb—Te—N has the peak in the vicinity of 600 $cm^{-1}$ to 650 $cm^{-1}$.

A conceivable method of adding nitrogen N to the phase-change alloy of the recording layer 3 is that argon gas mixed with nitrogen gas of 10 mol % or below is applied when forming the recording layer 3 by a sputtering technique. The recording layer 3 which is suitable for the desired linear rotation rates of the recording medium 10 can be obtained by using such a method. In addition, when the above-mentioned mixture gas is applied, the overwriting repetition property will be improved.

Further, the addition of a small amount of B, C, P, Si, S, Se, Al, Ti, V, Mn, Fe, Co, Ni, Cu, Ga, Zn, Sn, Pd, Py or Au to the phase-change alloy of the recording layer 3 is effective for increasing the performance and reliability of the recording medium 10. the amount of N added.

In the present embodiment of the recording medium 10, the heat-dissipating reflection layer 5 is formed on the second protective layer 4, and the overcoat layer 6 is formed on the reflection layer 5. The reflection layer 5 serves to dissipate excessive heat from the recording layer 3. The overcoat layer 6 serves to prevent the oxidation of the reflection layer 5.

The heat-dissipating reflection layer 5 can be formed from a metal or metal-oxide material. For example, Al, Au, Ag, or Cu, their alloys or their oxides can be used as the source material of the reflection layer 5. The heat-dissipating reflection layer 5 can be formed by utilizing any suitable one of various vapor deposition techniques including vacuum deposition, sputtering, plasma CVD (chemical vapor deposition), light CVD, ion plating, and electron-beam deposition. A suitable thickness of the reflection layer 5 when taking account of the heat dissipation efficiency and the layer strength is in a range from 70 nm to 180. When attaching importance to the aspects of film quality and volume production feasibility, the most suitable thickness of the reflection layer 5 is in a range from 100 nm to 160 nm.

The overcoat layer 6 can be formed from an ultraviolet (UV) curing resin by using a spin-coat method. A suitable thickness of the overcoat layer 6 is in a range from 7 $\mu$m to 15 $\mu$m. If the thickness of the overcoat layer 6 is above the upper limit of 15 $\mu$m, the internal stress will not be negligible, which is detrimental to the physical properties of the recoding medium 10. If the thickness of the overcoat layer 6 is below the lower limit of 7 μm, the possibility of an error when forming the print layer 7 on the overcoat layer 6 will be increased.

The initializing, recording, reproducing, erasing and overwriting of the recording medium 10 in the present embodiment can be carried out by applying a light beam to the recording medium 10. It is preferred that a laser beam or a visible-light beam be applied to the recording medium 10. A suitable light source is a semiconductor laser which emits a beam of monochromatic laser light with a given wavelength.

Next, a description will be given of the preferred embodiments of the optical recording method according to the invention with reference to FIG. 4A through FIG. 8B.

The waveforms of 1's or 0's data signals, as shown in FIG. 4A through FIG. 8B, can be produced by controlling a pulsewidth-modulated (PWM) converter and a semiconductor laser of an optical pickup. The PWM converter is a power electronic converter that employs a square-wave power-controlling waveform with variation of pulsewidth for controlling the power supplied to the semiconductor laser. The semiconductor laser is operated in accordance with the controlled power supplied by the PWM converter so that the semiconductor laser emits a laser beam to the recording medium along the track. Hence, the power-control pulses in such a waveform create a sequence of amorphous/crystalline phases along the track of the recording medium.

By referring to FIG. 4A through FIG. 4C, a waveform of a recording signal used by an embodiment of the optical recording method of the invention will now be explained. Suppose that the PWM converter and the semiconductor laser of the optical pickup are provided as described above.

The recording medium 10 according to the invention is configured to provide the capabilities of reading, writing and overwriting of information at linear rotation rates ranging from 1.2 m/s to 11.2 m/s. The present embodiment of the optical recording method according to the invention is provided to achieve the reading, writing and overwriting of information for the recording medium 10 at the linear rotation rates of 1.2 m/s to 11.2 m/s without significant degradation.

Figure 4A:
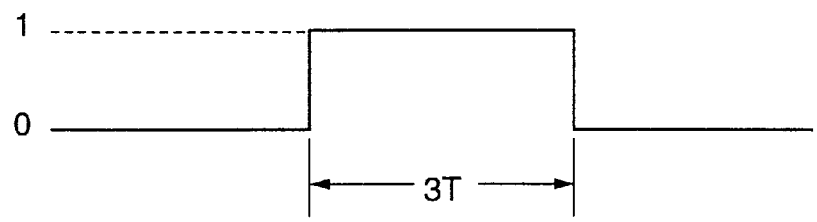
FIG. 4A, FIG. 4B and FIG. 4C are diagrams for explaining a waveform of a recording signal used by an embodiment of the optical recording method of the invention.

FIG. 4A shows a waveform of a simple 1's data signal with a fixed clock duration. The fixed clock duration is given by an integer multiple of a basic clock duration T. In the present embodiment, the fixed clock duration is represented by 3 T. Assuming that the fixed clock duration of the 1's data signal is given by nT where T is the basic clock duration and n is an integer, the integer n in the present embodiment is equal to 3. The simple 1's data signal of FIG. 4A is called the 3 T data signal.

Figure 4B:
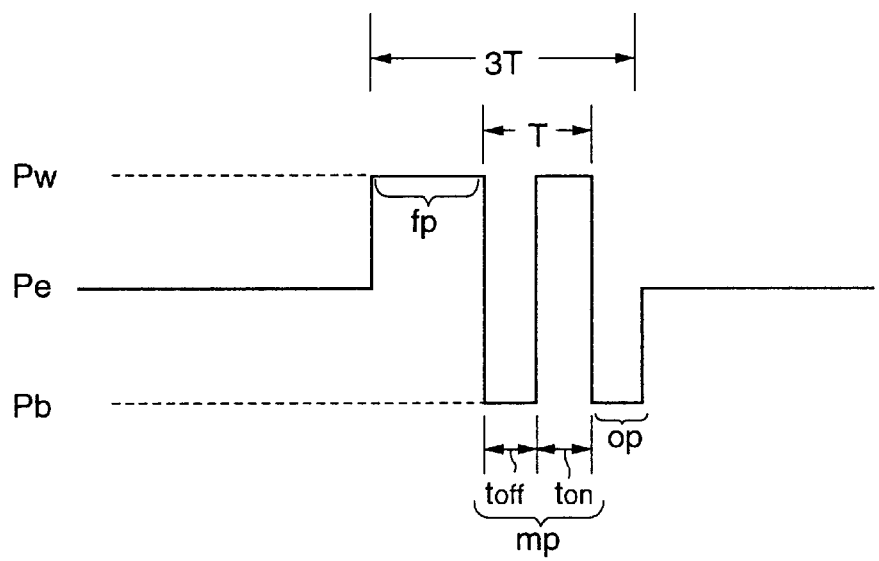

FIG. 4B shows a waveform of a 1's data signal, including power-control pulses, which has the fixed clock duration 3 T. The semiconductor laser is operated in accordance with a controlled power supplied by the PWM converter in response to the power-control pulses of the data signal. The data signal is encoded in the recording layer of the recording medium by a laser beam emitted by the semiconductor laser when the recording medium is rotated at a given linear rotation rate.

As shown in FIG. 4B, the controlled power, supplied to the semiconductor laser, includes a write power level Pw, an erase power level Pe and a biased power level Pb, where Pw>Pe>Pb. The waveform of power-control pulses, shown in FIG. 4B, includes a front-end pulse portion fp, a multi-pulse portion mp, and a rear-end pulse portion op. In the fixed clock duration 3 T of the data signal, a duration of the front-end pulse portion fp is called the front-end pulse duration, a duration of the multi-pulse portion mp is called the multi-pulse duration, and a duration of the rear-end pulse portion op is called a rear-end pulse duration.

In the waveform of the data signal of FIG. 4B, the front-end pulse portion fp is provided to heat the recording layer 3 by the laser energy, so as to form a front edge of the write mark in the recording layer 3. The multi-pulse portion mp includes a number of cycles, each cycle including the write power level Pw for a pulse duration $t_{on}$ and the biased power level Pb for a pulse duration $t_{off}$. The multi-pulse portion mp is provided to heat the recording layer 3 by the laser energy, so as to form an intermediate part of the write mark in the recording layer 3. The rear-end pulse portion op is provided to rapidly cool the recording layer 3, so as to form a rear edge of the write mark in the recording layer 3.

In the waveform of the data signal of FIG. 4B, the number of cycles of the multi-pulse portion mp is equal to 1. This cycle of the multi-pulse portion mp is defined by the write power level Pw for the pulse duration $t_{on}$ and the biased power level Pb for the pulse duration $t_{off}$ preceding the pulse duration $t_{on}$. A duty ratio Z of the multi-pulse portion mp in the 1's data signal, which represents a ratio of the on-time of the semiconductor laser to the multi-pulse duration, is given by the formula $t_{on}/(t_{on}+t_{off})$. Each of the linear rotation rates of the recording medium 10 is set to an integer multiple of a basic linear rotation rate Vmin which ranges from 1.2 m/s to 1.4 m/s. In the present embodiment of the optical recording method, the duty ratio Z (=$t_{on}/(t_{on}+t_{off})$) is set to one of a plurality of ranges of 0.05 to 0.4, 0.1 to 0.6, 0.2 to 0.8, 0.25 to 1.0, and 0.3 to 1.0 for the linear rotation rates Vmin, 2Vmin, 4Vmin, 6Vmin, and 8Vmin, respectively.

In the waveform of the data signal of FIG. 4B, the multi-pulse portion mp includes the alternate power-control pulses of the write power level Pw for the pulse duration $t_{on}$ and the biased power level Pb for the pulse duration $t_{off}$. The present embodiment of the optical recording method is effective in preventing the recording layer 3 of the recording medium 10 from being excessively heated by the laser energy. The write mark stability can be increased and the transmission of heat in the recording layer 3 can restricted to a small amount.

In the present embodiment of the optical recording method, the duty ratio Z of the semiconductor laser is maintained at relatively low levels when the linear rotation rate of the recording medium 10 is low. Excessive heating of the recording layer 3 per unit length of the track of the recording medium 10 is prevented, and the reading, writing and overwriting of information for the recording medium 10 is possible without significant degradation. When the linear rotation rate of the recording medium 10 is increased, the duty ratio Z of the semiconductor laser is suitably increased to relatively high levels. An adequate level of the laser energy, applied to the unit length of the track of the recording medium 10, for the reading, writing and overwriting of information from the recording medium 10 is maintained. In a case in which the laser energy applied to the unit length of the track becomes insufficient when the linear rotation rate is increased, the biased power level Pb may be increased to a higher level in accordance with the increase of the linear rotation rate.

Figure 4C:
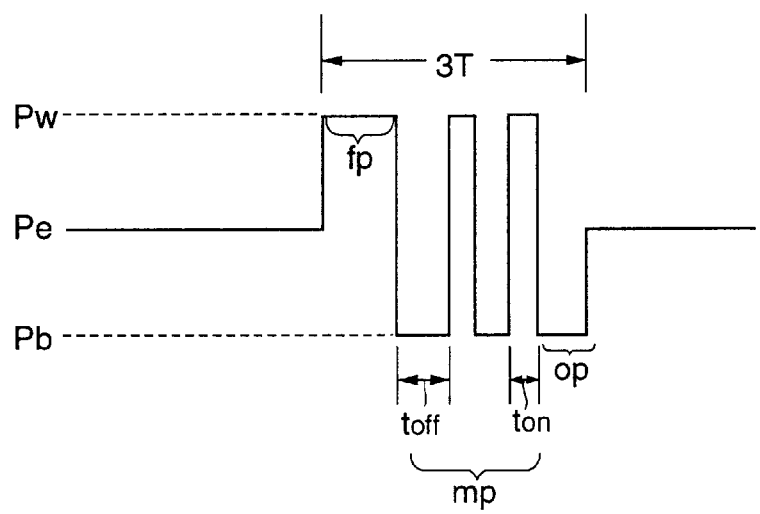

FIG. 4C shows a waveform of another 1's data signal, including power-control pulses, which has the fixed clock duration 3 T. In the present embodiment, the semiconductor laser is operated in accordance with a controlled power supplied by the PWM converter in response to the power-control pulses of the data signal. The data signal is encoded in the recording layer of the recording medium by a laser beam emitted by the semiconductor laser when the recording medium is rotated at a given linear rotation rate.

Similar to the data signal of FIG. 4B, in the 1's data signal of FIG. 4C, the controlled power, supplied to the semiconductor laser, includes the write power level Pw, the erase power level Pe and the biased power level Pb, where Pw>Pe>Pb. The waveform of power-control pulses, shown in FIG. 4C, includes the front-end pulse portion fp, the multi-pulse portion mp, and the rear-end pulse portion op.

In the waveform of the data signal of FIG. 4C, the number of cycles of the multi-pulse portion mp is given by (2n−n') where n' is an integer and n'≦n. An entire duration of the multi-pulse portion mp in the 1's data signal is equal to or larger than the basic clock duration T. Each of the number of cycles of the multi-pulse portion mp is defined by the write power level Pw for the pulse duration $t_{on}$ and the biased power level Pb for the pulse duration $t_{off}$ preceding the pulse duration $t_{on}$. In the example of FIG. 4C, n=3 and n'=3. For the sake of simplicity of illustration, the waveform of the data signal of FIG. 3C is simplified so as to include only two cycles of the multi-pulse portion mp.

In the waveform of the data signal of FIG. 4C, the duty ratio Z of the multi-pulse portion mp in the 1's data signal is given by $t_{on}/(t_{on}+t_{off})$ and ranges from 0.05 to 0.25. In the present embodiment of the optical recording method, the number of cycles of the multi-pulse portion mp in the 1's data signal can be suitably adjusted in accordance with the value of the integer n'. When the linear rotation rate of the recording medium 10 is increased, the duty ratio Z of the semiconductor laser is suitably increased to the upper limit of the range of between 0.05 and 0.25. An adequate level of the laser energy, applied to the unit length of the track of the recording medium 10, for the reading, writing and overwriting of information from the recording medium 10 is maintained by suitably controlling the duty ratio Z and the integer n'.

Figure 5A:
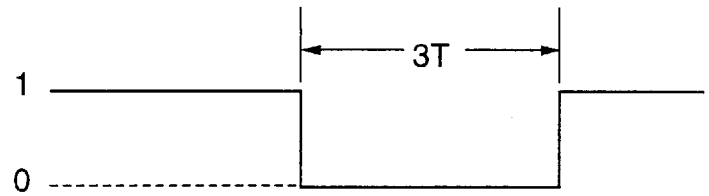
FIG. 5A and FIG. 5B are diagrams for explaining a waveform of a recording signal used by the embodiment of the optical recording method of the invention.
Figure 5B:
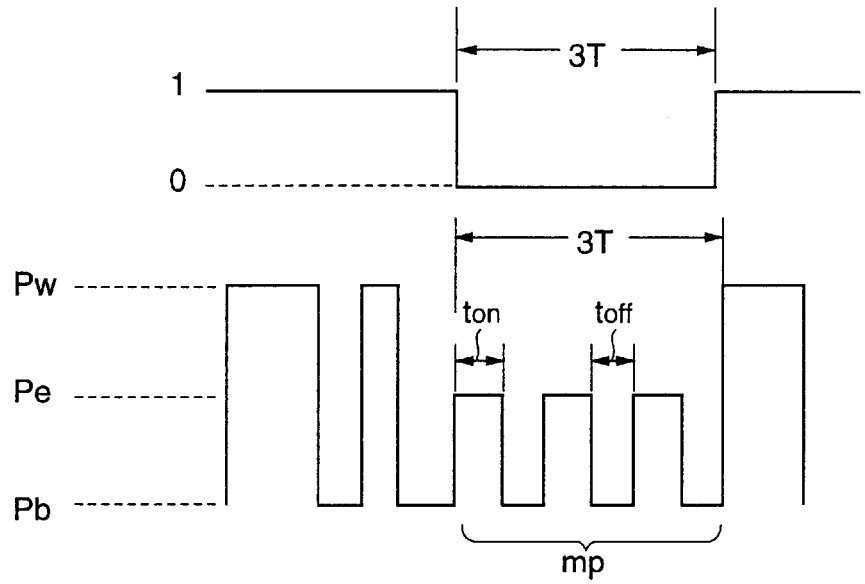

FIG. 5A and FIG. 5B show a waveform of a recording signal used by the present embodiment of the optical recording method of the invention.

FIG. 5A shows a waveform of a simple 0's data signal with a fixed clock duration. The fixed clock duration is given by an integer multiple of a basic clock duration T. In the present embodiment, the fixed clock duration is represented by 3 T. The simple 0's data signal of FIG. 5A is also called the 3 T data signal.

FIG. 5B shows a waveform of a 0's data signal, including power-control pulses, which has the fixed clock duration 3 T. The semiconductor laser is operated in accordance with a controlled power supplied by the PWM converter in response to the power-control pulses of the data signal. The data signal is encoded in the recording layer of the recording medium by a laser beam emitted by the semiconductor laser when the recording medium is rotated at a given linear rotation rate.

As shown in FIG. 5B, the controlled power, supplied to the semiconductor laser, includes the write power level Pw, the erase power level Pe and the biased power level Pb, where Pw>Pe>Pb. The waveform of power-control pulses, shown in FIG. 5B, includes only a multi-pulse portion mp which includes a number of cycles of the power-control pulses. Each of the number of cycles of the multi-pulse portion mp is defined by the erase power level Pe for a pulse duration $t_{on}$ and the biased power level Pb for a pulse duration $t_{off}$ following the pulse duration $t_{on}$. The number of cycles of the multi-pulse portion mp is given by (n−n') where n' is an integer and n'≦n. An entire duration of the multi-pulse portion mp is equal to or larger than T. A duty ratio Y of the 0' data signal, which represents a ratio of the on-time of the semiconductor laser to the multi-pulse duration and is given by $t_{on}/(t_{on}+t_{off})$, ranges from 0.4 to 0.6. In the example of FIG. 5A, the number of cycles (n−n') of the multi-pulse portion mp is equal to 3, n=3, and n'=0.

In the present embodiment of the optical recording method, the number of cycles of the multi-pulse portion mp in the 0's data signal can be suitably adjusted in accordance with the value of the integer n'. When the linear rotation rate of the recording medium 10 is increased, the duty ratio Y of the semiconductor laser is suitably increased to the upper limit of the range of between 0.4 and 0.6. An adequate level of the laser energy, applied to the unit length of the track of the recording medium 10, for the reading, writing and overwriting of information from the recording medium 10 is maintained by suitably controlling the duty ratio Y and the integer n'.

By referring to FIG. 6A and FIG. 6B, a waveform of a recording signal used by another embodiment of the optical recording method of the invention will now be explained. Suppose that the PWM converter and the semiconductor laser of the optical pickup are provided as described above.

Figure 6A:
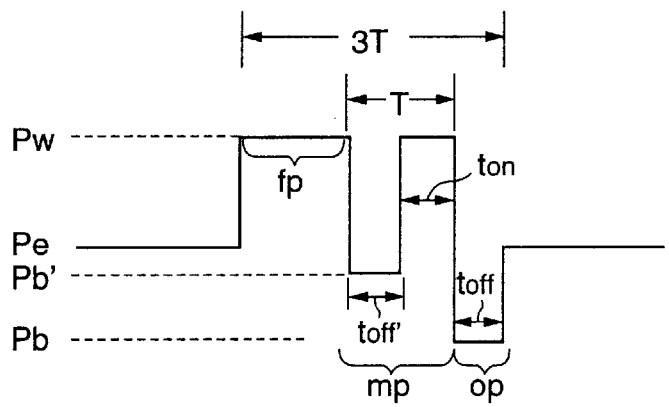
FIG. 6A and FIG. 6B are diagrams for explaining a waveform of a recording signal used by another embodiment of the optical recording method of the invention.

FIG. 6A shows a waveform of a 1's data signal with a fixed clock duration 3 T. The fixed clock duration is given by an integer multiple of the basic clock duration T, and in the present embodiment, the fixed clock duration is represented by 3 T. Assuming that the fixed clock duration of the 1's data signal is given by nT where T is the basic clock duration and n is an integer, the integer n in the present embodiment is equal to 3.

As shown in FIG. 6A, the controlled power, supplied to the semiconductor laser, includes a write power level Pw, an erase power level Pe, an increased biased power level Pb', and a biased power level Pb, where Pw>Pe>Pb'>Pb. The waveform of power-control pulses, shown in FIG. 6A, includes a front-end pulse portion fp, a multi-pulse portion mp, and a rear-end pulse portion op. In the fixed clock duration 3 T of the data signal, a duration of the front-end pulse portion fp is called the front-end pulse duration, a duration of the multi-pulse portion mp is called the multi-pulse duration, and a duration of the rear-end pulse portion op is called a rear-end pulse duration.

In the waveform of the data signal of FIG. 6A, the front-end pulse portion fp is provided to heat the recording layer 3 by the laser energy, so as to form a front edge of the write mark in the recording layer 3. The multi-pulse portion mp includes a number of cycles, each cycle including the write power level Pw for a pulse duration $t_{on}$ and the increased biased power level Pb' for a pulse duration $t_{off}'$. The multi-pulse portion mp is provided to heat the recording layer 3 by the laser energy, so as to form an intermediate part of the write mark in the recording layer 3. The rear-end pulse portion op is defined by the biased power level Pb for a pulse duration $t_{off}$. The rear-end pulse portion op is provided to rapidly cool the recording layer 3, so as to form a rear edge of the write mark in the recording layer 3.

In the waveform of the data signal of FIG. 6A, the number of cycles of the multi-pulse portion mp is equal to 1, but the multi-pulse portion mp contains at least one pulse of the increased biased power level Pb'. The cycle of the multi-pulse portion mp is defined by the write power level Pw for the pulse duration $t_{on}$ and the increased biased power level Pb' for the pulse duration $t_{off}'$ preceding the pulse duration $t_{on}$. An entire duration of the multi-pulse portion mp in the 1's data signal is equal to or larger than the basic clock duration T. A duty ratio Z of the multi-pulse portion mp in the 1's data signal, which represents a ratio of the on-time of the semiconductor laser to the multi-pulse duration, is given by the formula $t_{on}/(t_{on}+t_{off}')$.

Each of the linear rotation rates of the recording medium 10 is set to an integer multiple of the basic linear rotation rate Vmin which ranges from 1.2 m/s to 1.4 m/s. In the present embodiment of the optical recording method, the duty ratio Z ($=t_{on}/(t_{on}+t_{off}')$) is set to one of a plurality of ranges of 0.05 to 0.4, 0.1 to 0.6, 0.2 to 0.8, 0.25 to 1.0, and 0.3 to 1.0 for the linear rotation rates Vmin, 2Vmin, 4Vmin, 6Vmin, and 8Vmin, respectively.

Figure 6B:
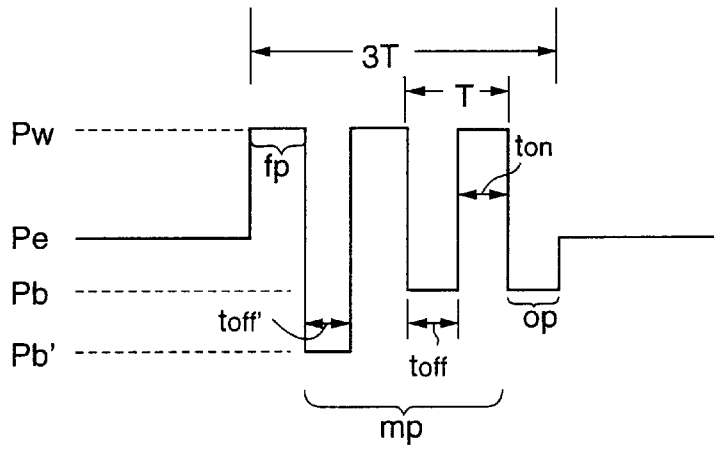

FIG. 6B shows a waveform of a 1's data signal with the fixed clock duration 3 T. As shown in FIG. 6B, the controlled power, supplied to the semiconductor laser, includes the write power level Pw, the erase power level Pe, a decreased biased power level Pb', and the biased power level Pb, where Pw>Pe>Pb>Pb'. The waveform of power-control pulses, shown in FIG. 6B, includes a front-end pulse portion fp, a multi-pulse portion mp, and a rear-end pulse portion op.

In the waveform of the data signal of FIG. 6B, the front-end pulse portion fp is provided to heat the recording layer 3 by the laser energy, so as to form a front edge of the write mark in the recording layer 3. The multi-pulse portion mp includes a number of cycles, the first cycle including the write power level Pw for a pulse duration $t_{on}$ and the decreased biased power level Pb' for a pulse duration $t_{off}'$, and each of the subsequent cycles including the write power level Pw for the pulse duration $t_{on}$ and the biased power level Pb for a pulse duration $t_{off}$. The multi-pulse portion mp is provided to heat the recording layer 3 by the laser energy, so as to form an intermediate part of the write mark in the recording layer 3. The rear-end pulse portion op is defined by the biased power level Pb for the pulse duration $t_{off}$. The rear-end pulse portion op is provided to rapidly cool the recording layer 3, so as to form a rear edge of the write mark in the recording layer 3.

In the waveform of the data signal of FIG. 6B, the number of cycles of the multi-pulse portion mp is equal to 2. The first cycle of the multi-pulse portion mp is defined by the write power level Pw for the pulse duration $t_{on}$ and the decreased biased power level Pb' for the pulse duration $t_{off}'$ preceding the pulse duration $t_{on}$. The second cycle is defined by the write power level Pw for the pulse duration $t_{on}$ and the biased power level Pb for the pulse duration $t_{off}$ preceding the pulse duration $t_{on}$. An entire duration of the second cycle of the multi-pulse portion mp in the 1's data signal is equal to or larger than the basic clock duration T.

In the waveforms of the data signals of FIG. 6A and FIG. 6B, the number of pulses of the multi-pulse portion mp in the 1's data signal is given by (n−n') where n' is an integer and n'≦n. As described above, in the example of FIG. 6A, n=3 and n'=2, and in the example of FIG. 6B, n=3 and n'=1.

In the waveforms of the data signals of FIG. 6A and FIG. 6B, the multi-pulse portion mp includes the alternate power-control pulses of the write power level Pw for the pulse duration $t_{on}$ and the modified biased power level Pb' for the pulse duration $t_{off}'$ (or the biased power level Pb for the pulse duration $t_{off}$) The present embodiment of the optical recording method is effective in preventing the recording layer 3 of the recording medium 10 from being excessively heated by the laser energy, because of the inclusion of at least one pulse of the modified biased power level Pb' in the multi-pulse portion mp. The write mark stability can be increased and the transmission of heat in the recording layer 3 can be restricted to a reasonably small amount.

In the present embodiment of the optical recording method, when the linear rotation rate of the recording medium 10 is increased to be in the range of 7.2–11.2 m/s, the duty ratio Z of the semiconductor laser is maintained at appropriate levels so as to ensure an adequate level of the laser energy, applied to the unit length of the track of the recording medium 10, for the reading, writing and overwriting of information from the recording medium 10 at the high rotation rate.

By referring to FIG. 7, a waveform of a recording signal used by another embodiment of the optical recording method of the invention will now be explained. Suppose that the PWM converter and the semiconductor laser of the optical pickup are provided.

Figure 7:
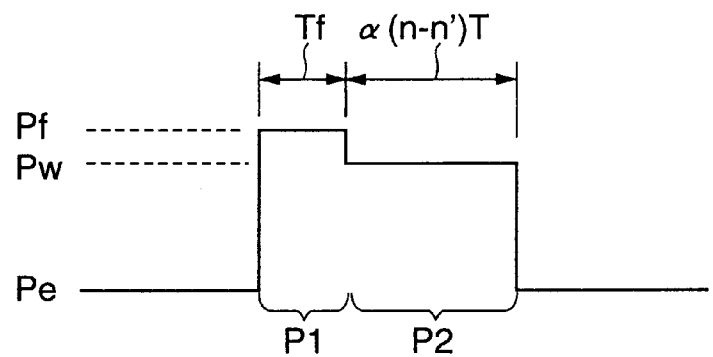
FIG. 7 is a diagram for explaining a waveform of a recording signal used by another embodiment of the optical recording method of the invention.

FIG. 7 shows a waveform of a 1's data signal with a fixed clock duration which is given by nT where T is the basic clock duration and n is an integer.

As shown in FIG. 7, the controlled power, supplied to the semiconductor laser, includes an increased write power level Pf, a write power level Pw, and an erase power level Pe, where Pf>Pw>Pe. The waveform of power-control pulses, as shown in FIG. 7, includes a first pulse portion P1 and a second pulse portion P2.

The waveform of the data signal of FIG. 7 is adapted to meet the laser energy requirement for a high linear rotation rate of the recording medium 10. In the waveform of the data signal of FIG. 7, the first pulse portion P1 is provided to heat the recording layer 3 by the increased write power level Pf, so as to suit the high rotation speed requirement. The first pulse portion P1 is defined by the increased write power level Pf for a pulse duration Tf where $0 \leq Tf \leq 1.5$ T. The second pulse portion P2 is provided to retain the laser energy at the write power level Pw. The second pulse portion P2 is defined by the write power level Pw for a pulse duration $\alpha(n-n')T$ following the pulse duration Tf, where $\alpha$ is a coefficient, n' is an integer and n'≦n.

In the waveform of the data signal of FIG. 7, the pulse duration Tf related to the increased write power level Pf is suitably adjusted to be in a range from 0 to 1.5 T, and the coefficient a related to the write power level Pw is suitably adjusted to be in a range from 0.75 to 1.25. It is possible for the present embodiment of the optical recording method to ensure an adequate level of the laser energy, applied to the unit length of the track of the recording medium 10, for the reading, writing and overwriting of information from the recording medium 10 at the high rotation rate.

By referring to FIG. 8A and FIG. 8B, a waveform of a recording signal used by another embodiment of the optical recording method of the invention will now be explained. Suppose that the PWM converter and the semiconductor laser of the optical pickup are provided.

Figure 8A:
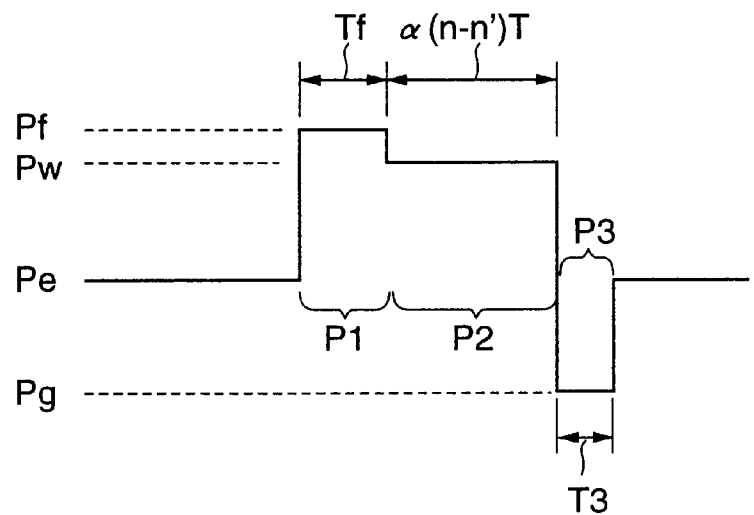
FIG. 8A and FIG. 8B are diagrams for explaining a waveform of a recording signal used by another embodiment of the optical recording method of the invention.

FIG. 8A shows a waveform of a 1's data signal with a fixed clock duration which is given by nT where T is the basic clock duration and n is an integer.

As shown in FIG. 8A, the controlled power, supplied to the semiconductor laser, includes an increased write power level Pf, a write power level Pw, an erase power level Pe, and a rear-end biased power level Pg, where Pf>Pw>Pe≧Pg≧0. The waveform of power-control pulses, as shown in FIG. 8A, includes a third pulse portion P3 in addition to the first pulse portion P1 and the second pulse portion P2 shown in FIG. 7.

In the waveform of the data signal of FIG. 8A, the first pulse portion P1 and the second pulse portion P2 are defined in the same manner as those in the waveform of FIG. 7. The third pulse portion P3 is defined by the rear-end biased power level Pg for a pulse duration T3 following the pulse duration $\alpha(n-n')T$, where $0.2\ T \leq T3 \leq 1.0$ T. The third pulse portion P3 is provided to rapidly cool the recording layer 3, so as to form a clear boundary of the write mark at the rear edge in the recording layer 3.

In the waveform of the data signal of FIG. 8A, the pulse duration T3 related to the rear-end biased power level Pg is suitably adjusted to be in a range from 0.2 T to 1.0 T. It is possible for the present embodiment of the optical recording method to ensure an adequate level of the laser energy, applied to the unit length of the track of the recording medium 10, for the reading, writing and overwriting of information from the recording medium 10 at the high rotation rate. Further, the formation of a clear boundary of the write mark at the rear edge in the recording layer 3 is possible.

Figure 8B:
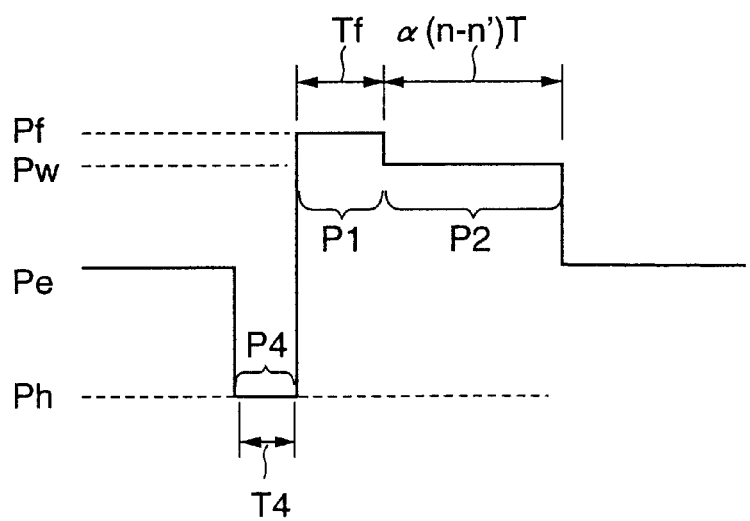

FIG. 8B shows a waveform of a 1's data signal with a fixed clock duration which is given by nT where T is the basic clock duration and n is an integer.

As shown in FIG. 8B, the controlled power, supplied to the semiconductor laser, includes an increased write power level Pf, a write power level Pw, an erase power level Pe, and a front-end biased power level Ph, where Pf>Pw>Pe≧Ph≧0. The waveform of power-control pulses, as shown in FIG. 8B, includes a fourth pulse portion P4 in addition to the first pulse portion P1 and the second pulse portion P2 shown in FIG. 7.

In the waveform of the data signal of FIG. 8B, the first pulse portion P1 and the second pulse portion P2 are defined in the same manner as those in the waveform of FIG. 7. The fourth pulse portion P4 is defined by the front-edge biased power level Ph for a pulse duration T4 preceding the pulse duration Tf, where 0.2 T≦T4≦1.0 T. The fourth pulse portion P4 is provided to rapidly cool the recording layer 3, so as to form a clear boundary of the write mark at the front edge in the recording layer 3.

In the waveform of the data signal of FIG. 8B, the pulse duration T4 related to the front-end biased power level Ph is suitably adjusted to be in a range from 0.2 T to 1.0 T. It is possible for the present embodiment of the optical recording method to ensure an adequate level of the laser energy, applied to the unit length of the track of the recording medium 10, for the reading, writing and overwriting of information from the recording medium 10 at the high rotation rate. Further, the formation of a clear boundary of the write mark at the front edge in the recording layer 3 is possible.

Next, a description will be given of some examples of the information recording media according to the present invention as well as the optical recording method for each of the examples of the information recording media according to the present invention.

EXAMPLE 1

Example 1 of the information recording medium according to the invention is formed into a rewritable compact disk (CD-RW) as follows.

On a polycarbonate substrate with a thickness of 1.2 mm, a first protective layer of ZnS.SiO$_2$ with a thickness of 100 nm is formed. A recording layer with a thickness of 20 nm, which is composed of a phase-change alloy with the composition in terms of atomic percentage being represented by the formula:

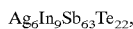

$Ag_6In_9Sb_{63}Te_{22}$, is formed on the first protective layer. A second protective layer of ZnS.SiO$_2$ with a thickness of 25 nm is formed on the recording layer. A heat-dissipating reflection layer of an aluminum alloy with a thickness of 160 nm is formed on the second protective layer. An overcoat layer of an ultraviolet (UV) curing resin with a thickness of 10 μm is formed on the reflection layer.

The compact disk of example 1 is rotated at linear rotation rates ranging from 1.2 m/s to 9.6 m/s, and the writing and overwriting of the compact disk is performed by using an optical pickup. The optical pickup has a basic clock frequency of 8.64 MHz and may use an integer multiple of the basic clock frequency as a fixed clock frequency for writing. When the compact disk is rotated at the linear rotation rate of 1.2 m/s, the EFM (eight-to-fourteen modulated) signal is converted by the PWM converter into a sequence of laser power-control pulses and such pulses are supplied to a semiconductor laser of the optical pickup at the clock frequency of 8.64 MHz. When the linear rotation rate is increased up to 9.6 m/s, the power-control pulses are created and supplied to the semiconductor laser at the clock frequency of 69.12 (=8.64×8) MHz. In the optical pickup, the semiconductor laser emits a beam of monochromatic laser light with a wavelength of 780 nm, and the objective lens has a numerical aperture (NA) of 0.5.

The writing and overwriting of the compact disk of example 1 is performed by supplying the 1's data signal in the waveform of FIG. 6A and the 0's data signal in the waveform of FIG. 5B. For the sake of simplicity of description, suppose that the 1's and 0's data signals have the total signal duration 3 T (or n=3).

In the waveform of the 1's data signal of FIG. 6A, the duty ratio Z, which represents the ratio of the on-time of the laser to the multi-pulse duration and is given by $t_{on}/(t_{on}+t_{off})$, is set to 0.1, 0.2, 0.3, 0.4, and 0.5 for the linear rotation rates of 1.2 m/s, 2.4 m/s, 4.8 m/s, 7.2 m/2, and 9.6 m/s, respectively. The number of cycles in the multi-pulse portion of the 1's data signal is set to (n−2) (=1). The biased power level Pb supplied to the laser is set to 0.5 mW for the linear rotation rates of 1.2 m/s, 2.4 m/s and 4.8 m/s, set to 4 mW for the linear rotation rate of 7.2 m/s, and set to 6 mW for the linear rotation rate of 9.6 m/s.

In the waveform of the 0's data signal of FIG. 5B, the ratio of the erase power level to the write power level, which is given by Pe/Pw, is set to 0.5. The duty ratio Y, which the ratio of the on-time of the laser to the multi-pulse duration and is given by $t_{on}/(t_{on}+t_{off})$, is set to 0.5.

Figure 9:
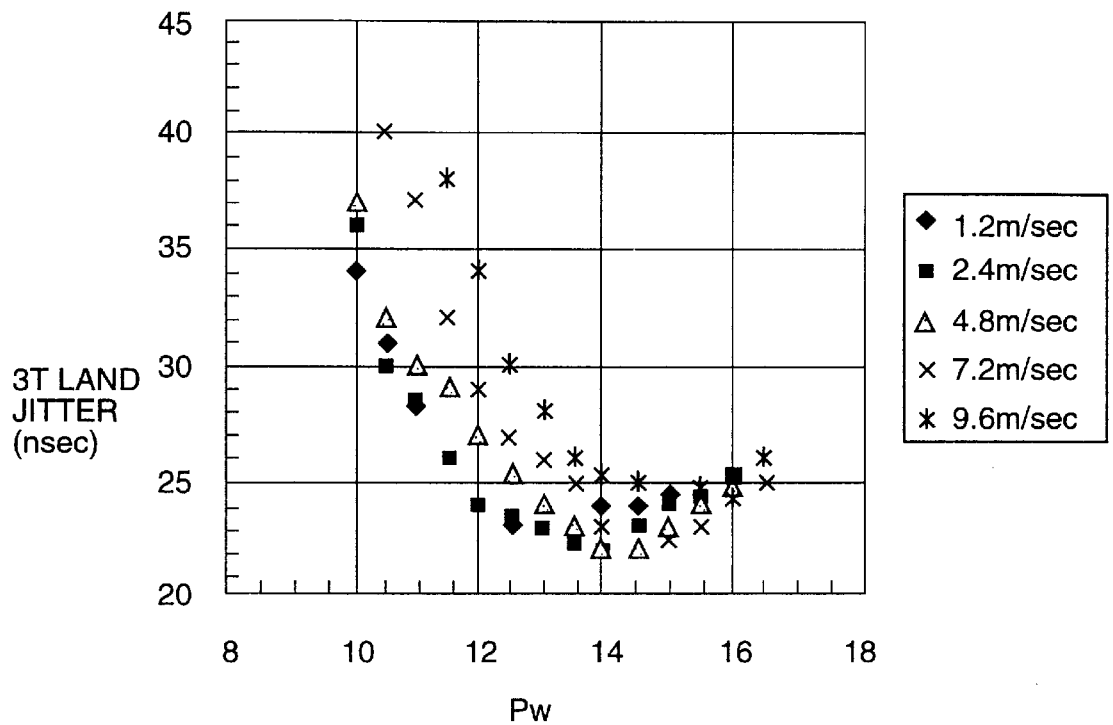
FIG. 9 is a diagram for explaining recording characteristics of example 1 of the information recording medium of the invention.

FIG. 9 shows the recording characteristics of example 1 of the information recording medium of the invention. As shown in FIG. 9, it has been found that the compact disk of example 1 in the initial condition provides very good 3 T land jitter characteristics to the write power level Pw. Further, it has been found that the 3 T land jitter characteristics of the compact disk of example 1 do not significantly deteriorate after the overwriting was repeated 1000 times.

EXAMPLE 2

Example 2 of the information recording medium according to the invention is formed into a rewritable compact disk (CD-RW) as follows.

On a polycarbonate substrate with a thickness of 1.2 mm, a first protective layer of ZnS.SiO$_2$ with a thickness of 90 nm is formed. A recording layer with a thickness of 21 nm, which is composed of a phase-change alloy with the composition in terms of atomic percentage being represented by the formula:

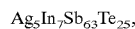

$Ag_5In_7Sb_{63}Te_{25}$, is formed on the first protective layer. A second protective layer of ZnS.SiO$_2$ with a thickness of 25 nm is formed on the recording layer. A heat-dissipating reflection layer of an aluminum alloy with a thickness of 150 nm is formed on the second protective layer. An overcoat layer of an ultraviolet (UV) curing resin with a thickness of 10 μm is formed on the reflection layer.

The compact disk of example 2 is rotated at linear rotation rates ranging from 1.2 m/s to 9.6 m/s, and the writing and overwriting of the compact disk is performed by using an optical pickup. The optical pickup has a basic clock frequency of 8.64 MHz and may use an integer multiple of the basic clock frequency as a fixed clock frequency for writing. When the compact disk is rotated at the linear rotation rate of 1.2 m/s, the EFM signal is converted by the PWM converter into a sequence of laser power-control pulses and such pulses are supplied to a semiconductor laser of the optical pickup at the clock frequency of 8.64 MHz. When the linear rotation rate is increased up to 9.6 m/s, the power-control pulses are created and supplied to the semiconductor laser at the clock frequency of 69.12 (=8.64×8) MHz. In the optical pickup, the semiconductor laser emits a beam of monochromatic laser light with a wavelength of 780 nm, and the objective lens has a numerical aperture (NA) of 0.5.

The writing and overwriting of the compact disk of example 2 is performed by supplying the 1's data signal in the waveform of FIG. 6A or FIG. 4C and the 0's data signal in the waveform of FIG. 5B. For the sake of simplicity of description, suppose that the 1's and 0's data signals have the total signal duration 3 T (or n=3).

In the waveform of the 1's data signal of FIG. 6A or FIG. 4C, the duty ratio Z, which is given by $t_{on}/(t_{on}+t_{off})$, is set to 0.1, 0.2, 0.3, 0.4, and 0.5 for the linear rotation rates of 1.2 m/s, 2.4 m/s, 4.8 m/s, 7.2 m/s, and 9.6 m/s, respectively. The number of cycles in the multi-pulse portion of the 1's data signal is set to (2n−3) (=3) for the linear rotation rates of 1.2 m/s and 2.4 m/s, and set to (n−2) (=1) for the linear rotation rates of 4.8 m/s, 7.2 m/s and 9.6 m/s. The biased power level Pb supplied to the laser is invariably set to 0.5 mW for all the linear rotation rates of 1.2 m/s through 9.6 m/s.

In the waveform of the 0's data signal of FIG. 5B, the ratio of the erase power level to the write power level, which is given by Pe/Pw, is set to 0.5. The duty ratio Y, which is given by $t_{on}/(t_{on}+t_{off})$, is set to 0.5.

Figure 10:
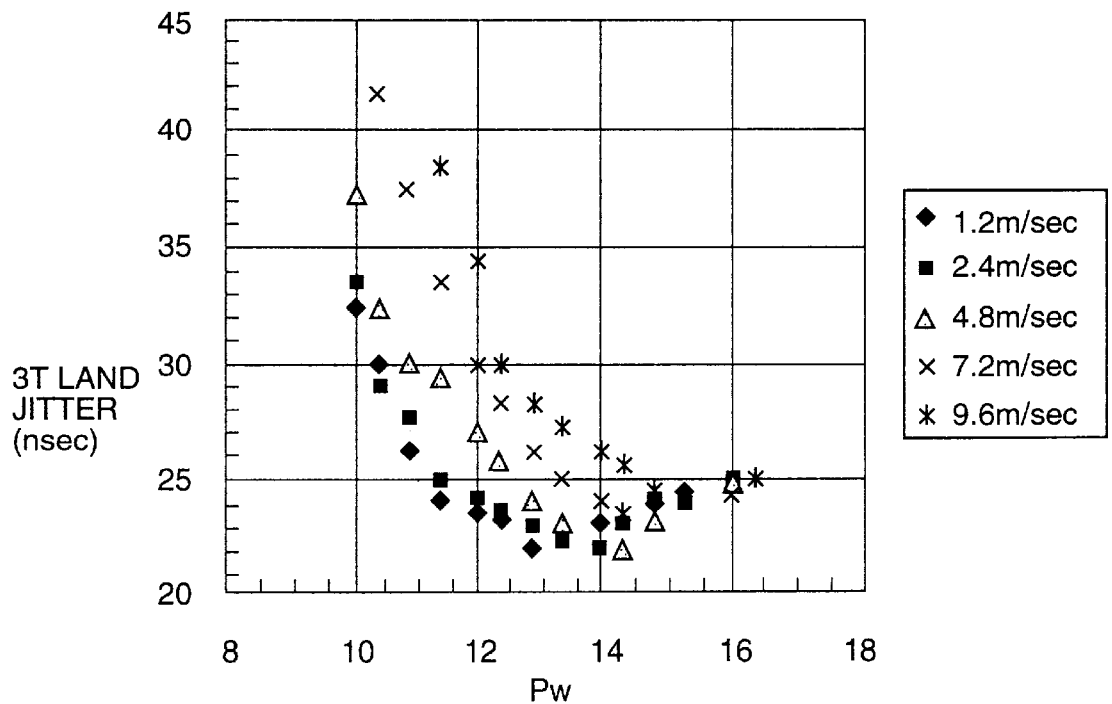
FIG. 10 is a diagram for explaining recording characteristics of example 2 of the information recording medium of the invention.

FIG. 10 shows the recording characteristics of example 2 of the information recording medium of the invention. As shown in FIG. 10, it has been found that the compact disk of example 2 in the initial condition provides very good 3 T land jitter characteristics to the write power level Pw. Further, it has been found that the 3 T land jitter characteristics of the compact disk of example 2 do not significantly deteriorate after the overwriting was repeated 1000 times.

EXAMPLE 3

Example 3 of the information recording medium according to the invention is formed into a rewritable compact disk (CD-RW) in the same manner as the above-mentioned example 1.

The compact disk of example 3 is rotated at linear rotation rates ranging from 1.2 m/s to 9.6 m/s, and the writing and overwriting of the compact disk is performed by using the optical pickup that is the same as that in the above-mentioned example 1. The optical pickup has the basic clock frequency of 8.64 MHz and may use an integer multiple of the basic clock frequency as a fixed clock frequency for writing. When the compact disk is rotated at the linear rotation rate of 1.2 m/s, the EFM signal is converted by the PWM converter into a sequence of laser power-control pulses and such pulses are supplied to the semiconductor laser at the clock frequency of 8.64 MHz. When the linear rotation rate is increased up to 9.6 m/s, the power-control pulses are created and supplied to the semiconductor laser at the clock frequency of 69.12 (=8.64×8) MHz.

The writing and overwriting of the compact disk of example 3 is performed. For the linear rotation rates of 1.2 m/s, 2.4 m/s and 4.8 m/s, the 1's data signal in the waveform of FIG. 6A is supplied to the semiconductor laser of the optical pickup. For the linear rotation rates of 7.2 m/s and 9.6 m/s, the 1's data signal in the waveform of FIG. 8B is supplied to the semiconductor laser. For all the linear rotation rates, the 0's data signal in the waveform of FIG. 5B is supplied to the semiconductor laser. For the sake of simplicity of description, suppose that the 1's and 0's data signals have the total signal duration 3 T (or n=3).

In the waveform of the 1's data signal of FIG. 6A, the duty ratio Z, which is given by $t_{on}/(t_{on}+t_{off})$, is set to 0.1, 0.2, and 0.3 for the linear rotation rates of 1.2 m/s, 2.4 m/s, and 4.8 m/s, respectively. The number of cycles in the multi-pulse portion of the 1's data signal is set to (n−2) (=1) for these linear rotation rates. The biased power level Pb supplied to the laser is invariably set to 0.5 mW for these linear rotation rates of 1.2 m/s through 4.8 m/s.

In the waveform of the 1's data signal of FIG. 8B, the front-end biased power level Ph in the pulse portion P4 of the 1's data signal is set to 0.5 mW, and the duration T4 of the pulse portion P4 thereof is set to 0.25 T. The increased write power level Pf in the pulse portion P1 of the 1's data signal is set to 1.2 mW, and the duration Tf of the pulse portion P1 is set to 0.75 T. The write power level Pw in the pulse portion P2 of the 1's data signal is set to 1.0 mW, and the duration α(n−n')T of the pulse portion P2 is set to 0.9(n−1)T (=1.8 T).

In the waveform of the 0's data signal of FIG. 5B, the ratio of the erase power level to the write power level, which is given by Pe/Pw, is set to 0.5. The duty ratio Y, which is given by $t_{on}/(t_{on}+t_{off})$, is set to 0.5.

Figure 11:
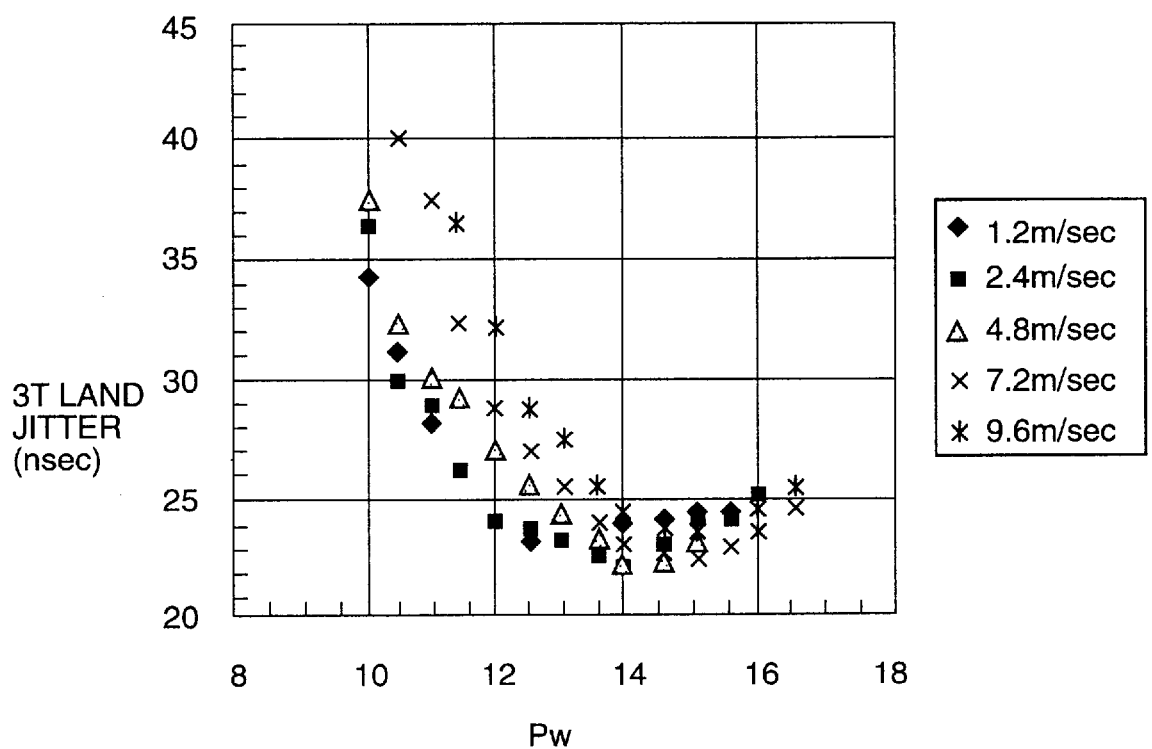
FIG. 11 is a diagram for explaining recording characteristics of example 3 of the information recording medium of the invention.

FIG. 11 shows the recording characteristics of example 3 of the information recording medium of the invention. As shown in FIG. 11, it has been found that the compact disk of example 3 in the initial condition provides very good 3 T land jitter characteristics to the write power level Pw. Further, it has been found that the 3 T land jitter characteristics of the compact disk of example 3 do not significantly deteriorate after the overwriting was repeated 1000 times.

The present invention is not limited to the above-described embodiments, and variations and modifications may be made without departing from the scope of the present invention.

Further, the present invention is based on Japanese priority application No. 10-310,528, filed on Oct. 30, 1998, the entire contents of which are hereby incorporated by reference.

What is claimed is:

1. An information recording medium comprising a substrate, a first protective layer formed on the substrate, a recording layer formed on the first protective layer, and a second protective layer formed on the recording layer, the first protective layer having a thickness in a range from 65 nm to 130 nm, the second protective layer having a thickness in a range from 15 nm to 45 nm, the recording layer having a thickness in a range from 15 nm to 35 nm and being composed of a phase-change alloy with the composition in terms of atomic percentage being represented by the formula $Ag_aIn_bSb_cTe_d$ where $0<a\leq6$, $3\leq b\leq15$, $50\leq c\leq65$, $20\leq d\leq35$, $a+b+c+d=100$, the recording medium being configured to provide capabilities of reading, writing and overwriting of information at linear rotation rates ranging from 1.2 m/s to 11.2 m/s.

2. The information recording medium according to claim 1, further comprising a heat-dissipating reflection layer of a metal or metal-oxide material formed on the second protective layer, and an oxidation-preventing overcoat layer of an ultraviolet curing resin formed on the reflection layer, the reflection layer having a thickness in a range from 70 nm to 180 nm, and the overcoat layer having a thickness in a range from 7 nm to 15 nm.

3. The information recording medium according to claim 1, wherein the recording medium is formed into a rewritable compact disk.

4. An information recording medium comprising a substrate, a first protective layer formed on the substrate, a recording layer formed on the first protective layer, and a second protective layer formed on the recording layer, the first protective layer having a thickness in a range from 65 nm to 130 nm, the second protective layer having a thickness in a range from 15 nm to 45 nm, the recording layer having a thickness in a range from 15 nm to 35 nm and being composed of a phase-change alloy with the composition in terms of atomic percentage being represented by the formula

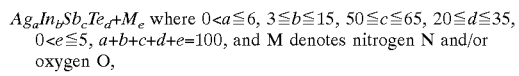

$Ag_aIn_bSb_cTe_d+M_e$ where $0<a\leq6$, $3\leq b\leq15$, $50\leq c\leq65$, $20\leq d\leq35$, $0<e\leq5$, $a+b+c+d+e=100$, and M denotes nitrogen N and/or oxygen O, the recording medium being configured to provide capabilities of reading, writing and overwriting of information at linear rotation rates ranging from 1.2 m/s to 11.2 m/s.

5. The information recording medium according to claim 4, further comprising a heat-dissipating reflection layer of a metal or metal-oxide material formed on the second protective layer, and an oxidation-preventing overcoat layer of an ultraviolet curing resin formed on the reflection layer, the reflection layer having a thickness in a range from 70 nm to 180 nm, and the overcoat layer having a thickness in a range from 7 nm to 15 nm.

6. The information recording medium according to claim 4, wherein the recording medium is formed into a rewritable compact disk.

7. An optical recording method for writing or overwriting of information to an information recording medium through a pulsewidth modulation PWM conversion, comprising the steps of:

providing an information recording medium which comprises a substrate, a first protective layer formed on the substrate, a recording layer formed on the first protective layer, and a second protective layer formed on the recording layer, the first protective layer having a thickness in a range from 65 nm to 130 nm, the second protective layer having a thickness in a range from 15 nm to 45 nm, the recording layer having a thickness in a range from 15 nm to 35 nm and being composed of a phase-change alloy with the composition in terms of atomic percentage being represented by the formula

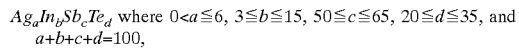

$Ag_aIn_bSb_cTe_d$ where $0<a\leq6$, $3\leq b\leq15$, $50\leq c\leq65$, $20\leq d\leq35$, and $a+b+c+d=100$, the recording medium being configured to provide capabilities of reading, writing and overwriting of information at linear rotation rates ranging from 1.2 m/s to 11.2 m/s; and supplying a data signal to a semiconductor laser via a PWM converter so that the laser is operated in accordance with a controlled power supplied by the PWM converter and the data signal is encoded in the recording layer of the recording medium by a laser beam emitted by the laser, wherein the data signal has a waveform of power-control pulses with a fixed clock duration, the controlled power supplied to the laser including at least three power levels including a write power level Pw, an erase power level Pe and a biased power level Pb, where Pw>Pe>Pb, the waveform of power-control pulses including a multi-pulse portion with a number of cycles, each cycle including a selected one of either the write power level Pw for a pulse duration $t_{on}$ and the biased power level Pb for a pulse duration $t_{off}$, or the erase power level Pe for a pulse duration $t_{on}$ and the biased power level Pb for a pulse duration $t_{off}$, wherein each of the linear rotation rates of the recording medium is set to an integer multiple of a basic linear rotation rate Vmin which ranges from 1.2 m/s to 1.4 m/s, and wherein a duty ratio of the multi-pulse portion in the data signal represents a ratio of an on-time of the semiconductor laser to a multi-pulse duration and is given by $t_{on}/(t_{on}+t_{off})$, and the duty ratio is set to one of a plurality of ranges of 0.05 to 0.4, 0.1 to 0.6, 0.2 to 0.8, 0.25 to 1.0, and 0.3 to 1.0 for the linear rotation rates Vmin, 2Vmin, 4Vmin, 6Vmin, and 8Vmin, respectively.

8. The method according to claim 7, wherein the data signal is a 1's data signal in which each of the number of cycles of the multi-pulse portion is defined by the write power level Pw for the pulse duration $t_{on}$ and the biased power level Pb for the pulse duration $t_{off}$ preceding the pulse duration $t_{on}$, the fixed clock duration of the data signal is given by nT where T is a basic clock duration and n is an integer, the number of cycles of the multi-pulse portion is given by (2n−n') where n' is an integer and n'≤n, an entire duration of the multi-pulse portion in the 1's data signal is equal to or larger than T, and a duty ratio Z of the 1's data signal is given by $t_{on}/(t_{on}+t_{off})$ and ranges from 0.05 to 0.25.

9. The method according to claim 7, wherein the data signal is a 0's data signal in which each of the number of cycles of the multi-pulse portion is defined by the erase power level Pe for the pulse duration $t_{on}$ and the biased power level Pb for the pulse duration $t_{off}$ following the pulse duration $t_{on}$, the fixed clock duration of the data signal is given by nT where T is a basic clock duration and n is an integer, the number of cycles of the multi-pulse portion is given by (n−n') where n' is an integer and n'≤n, an entire duration of the multi-pulse portion is equal to or larger than T, and a duty ratio Y of the 0' data signal is given by $t_{on}/(t_{on}+t_{off})$ and ranges from 0.4 to 0.6.

10. The method according to claim 7, wherein the data signal is a 1's data signal in which each of the number of cycles of the multi-pulse portion is defined by the write power level Pw for the pulse duration $t_{on}$, the biased power level Pb for the pulse duration $t_{off}$, and a modified biased power level Pb' for the pulse duration $t_{off}$ where Pw>Pe>Pb, Pb', Pb/≡Pb', the fixed clock duration of the data signal is given by nT where T is a basic clock duration and n is an integer, the number of cycles of the multi-pulse portion is given by (n−n') where n' is an integer and n'≤n, an entire duration of the multi-pulse portion in the 1's data signal is equal to or larger than T, and, when the recoding medium is rotated at a linear rotation rate ranging from 7.2 m/s to 11.2 m/s, the power levels for each of the cycles of the multi-pulse portion are set to meet the conditions Pw≧Pb≧0, and each cycle includes one or more pulses of the biased power level Pb and/or the modified biased power level Pb'.

11. The method according to claim 7, wherein the controlled power supplied to the laser further includes an increased write power level Pf where Pf>Pw, the fixed clock duration of the data signal is given by nT where T is a basic clock duration and n is an integer, the data signal is a 1's data signal in which the waveform of the data signal is defined by at least the increased write power level Pf for a pulse duration Tf and the write power level Pw for a pulse duration a(n−n')T following the pulse duration Tf, where a is a coefficient, n' is an integer and n'≦n, and wherein the pulse duration Tf is adjusted to be in a range from 0 to 1.5 T, and the coefficient a is adjusted to be in a range from 0.75 to 1.25.

12. The method according to claim 11, wherein the controlled power supplied to the laser includes a rear-end biased power level Pg where 0≦Pg≦Pe, and the waveform of the data signal includes the rear-end biased power level Pg for a pulse duration T3 where 0.2 T≦T3<1.0 T, and the pulse duration T3 of the rear-end biased power level Pg following the pulse duration α(n−n')T of the write power level Pw.

13. The method according to claim 11, wherein the controlled power supplied to the laser further includes a front-end biased power level Ph where 0≦Ph≦Pe, and the waveform of the data signal includes the front-end biased power level Ph for a pulse duration T4 where 0.2 T≦T4≦1.0 T, and the pulse duration T4 of the front-end biased power level Ph preceding the pulse duration Tf of the increased write power level Pf.

* * * * *